US008122492B2

(12) United States Patent
Horton et al.

(10) Patent No.: US 8,122,492 B2
(45) Date of Patent: Feb. 21, 2012

(54) INTEGRATION OF SOCIAL NETWORK INFORMATION AND NETWORK FIREWALLS

(75) Inventors: Noah Horton, Sammamish, WA (US); Sandeep K. Singhal, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 897 days.

(21) Appl. No.: 11/408,837

(22) Filed: Apr. 21, 2006

(65) Prior Publication Data

US 2007/0250922 A1   Oct. 25, 2007

(51) Int. Cl.
*H04L 29/00* (2006.01)
(52) U.S. Cl. ....................................................... 726/11
(58) Field of Classification Search .......... 709/223–224, 709/245; 713/170, 201; 726/1, 11–12
See application file for complete search history.

(56) References Cited

U.S. PATENT DOCUMENTS

| 5,606,668 | A | 2/1997 | Shwed |
| 5,802,591 | A | 9/1998 | Yachida |
| 5,835,726 | A | 11/1998 | Shwed et al. |
| 5,919,258 | A | 7/1999 | Kayashima et al. |
| 5,968,176 | A | 10/1999 | Nessett et al. |
| 5,974,549 | A | 10/1999 | Golan |
| 5,987,611 | A | 11/1999 | Freund |
| 6,003,084 | A | 12/1999 | Green et al. |
| 6,003,133 | A | 12/1999 | Moughanni et al. |
| 6,009,469 | A | 12/1999 | Mattaway et al. |
| 6,009,475 | A | 12/1999 | Shrader |
| 6,088,804 | A | 7/2000 | Hill et al. |
| 6,131,163 | A | 10/2000 | Wiegel |
| 6,149,585 | A | 11/2000 | Gray |
| 6,154,775 | A | 11/2000 | Coss et al. |
| 6,212,558 | B1 | 4/2001 | Antur et al. |
| 6,219,706 | B1 | 4/2001 | Fan et al. |
| 6,253,321 | B1 | 6/2001 | Nikander et al. |
| 6,347,376 | B1 | 2/2002 | Attwood et al. |
| 6,466,976 | B1 | 10/2002 | Alles et al. |
| 6,480,959 | B1 | 11/2002 | Granger et al. |
| 6,496,935 | B1 | 12/2002 | Fink et al. |
| 6,513,122 | B1 | 1/2003 | Magdych et al. |
| 6,611,875 | B1 * | 8/2003 | Chopra et al. ................ 709/245 |

(Continued)

FOREIGN PATENT DOCUMENTS

EP    0910197 A2    4/1999

(Continued)

OTHER PUBLICATIONS

Aberer, et al., "An Overview on Peer-to-Peer Information Systems," www.p-grid.org/papers/WDAS2002.pdf, 14 pages printed on Apr. 21, 2006.

(Continued)

*Primary Examiner* — Vivek Srivastava
*Assistant Examiner* — Anthony Brown

(57) ABSTRACT

A firewall functions normally to pass data on open ports to a respective service or endpoint associated with an open port. Invitations may sent to from an internal endpoint to an external peer-to-peer network endpoint inviting a connection back to the internal endpoint. Rather than leave ports open in a firewall for such connections, an invitation manager analyzes the invitation and in real time programs an exception in the firewall based on the invitation. The exceptions may be programmed for a limited duration, based on the nature of the internal endpoint. When an authenticated connection is required, a public key or handle to a public key for the external endpoint may be passed to the firewall for use in establishing the connection.

20 Claims, 5 Drawing Sheets

U.S. PATENT DOCUMENTS

| | | |
|---|---|---|
| 6,631,466 B1 | 10/2003 | Chopra et al. |
| 6,636,898 B1 | 10/2003 | Ludovici et al. |
| 6,643,776 B1 | 11/2003 | Boden |
| 6,697,810 B2 | 2/2004 | Kumar et al. |
| 6,721,890 B1 | 4/2004 | Shrikhande |
| 6,792,615 B1 | 9/2004 | Rowe et al. |
| 6,931,529 B2 | 8/2005 | Kunzinger |
| 6,938,155 B2 | 8/2005 | D'Sa et al. |
| 6,941,474 B2 | 9/2005 | Boies et al. |
| 6,944,183 B1 | 9/2005 | Iyer et al. |
| 6,976,177 B2 | 12/2005 | Ahonen |
| 7,016,901 B2 | 3/2006 | Eikenbery |
| 7,024,460 B2 | 4/2006 | Koopmas et al. |
| 7,120,931 B1 | 10/2006 | Cheriton |
| 7,290,145 B2 | 10/2007 | Falkenthros |
| 7,308,711 B2 | 12/2007 | Swander et al. |
| 7,567,560 B1* | 7/2009 | Balasubramaniyan ....... 370/389 |
| 7,761,708 B2 | 7/2010 | Swander et al. |
| 2001/0013049 A1 | 8/2001 | Ellis, III et al. |
| 2002/0038371 A1 | 3/2002 | Spacey |
| 2002/0097724 A1 | 7/2002 | Halme et al. |
| 2002/0143855 A1 | 10/2002 | Traversat et al. |
| 2002/0162026 A1 | 10/2002 | Neuman et al. |
| 2002/0194049 A1* | 12/2002 | Boyd ................................ 705/9 |
| 2003/0005328 A1 | 1/2003 | Grewal et al. |
| 2003/0028806 A1* | 2/2003 | Govindarajan et al. ....... 713/201 |
| 2003/0084331 A1 | 5/2003 | Dixon et al. |
| 2003/0084334 A1 | 5/2003 | Miyao et al. |
| 2003/0110379 A1 | 6/2003 | Ylonen et al. |
| 2003/0120809 A1* | 6/2003 | Bellur et al. .................. 709/239 |
| 2003/0233568 A1 | 12/2003 | Maufer et al. |
| 2004/0003290 A1 | 1/2004 | Malcolm |
| 2004/0037268 A1 | 2/2004 | Read |
| 2004/0078600 A1 | 4/2004 | Nilsen et al. |
| 2004/0148439 A1 | 7/2004 | Harvey et al. |
| 2004/0168150 A1 | 8/2004 | Ziv |
| 2004/0177273 A1* | 9/2004 | Ghaffar ......................... 713/201 |
| 2004/0205211 A1 | 10/2004 | Takeda et al. |
| 2004/0250131 A1 | 12/2004 | Swander et al. |
| 2004/0250158 A1 | 12/2004 | Le Pennec et al. |
| 2005/0005165 A1 | 1/2005 | Morgan et al. |
| 2005/0010816 A1 | 1/2005 | Yu et al. |
| 2005/0022010 A1 | 1/2005 | Swander et al. |
| 2005/0022011 A1 | 1/2005 | Swander et al. |
| 2005/0079858 A1* | 4/2005 | Rosen et al. .................. 455/411 |
| 2005/0091068 A1 | 4/2005 | Ramamoorthy et al. |
| 2005/0138380 A1 | 6/2005 | Fedronic et al. |
| 2005/0182967 A1 | 8/2005 | Phillips et al. |
| 2005/0198384 A1 | 9/2005 | Ansari et al. |
| 2005/0204402 A1 | 9/2005 | Turley et al. |
| 2005/0229246 A1 | 10/2005 | Rajagopal et al. |
| 2005/0262554 A1 | 11/2005 | Brooks et al. |
| 2005/0283823 A1* | 12/2005 | Okajo et al. ...................... 726/1 |
| 2006/0015935 A1 | 1/2006 | Dixon et al. |
| 2006/0062238 A1* | 3/2006 | Mahendran et al. .......... 370/437 |
| 2006/0101266 A1* | 5/2006 | Klassen et al. ................ 713/170 |
| 2006/0253901 A1* | 11/2006 | Roddy et al. .................... 726/11 |
| 2007/0118893 A1 | 5/2007 | Crawford |
| 2007/0174031 A1 | 7/2007 | Levenshteyn et al. |
| 2007/0261111 A1 | 11/2007 | Roberts |
| 2007/0271361 A1 | 11/2007 | Abzarian et al. |

FOREIGN PATENT DOCUMENTS

| | | |
|---|---|---|
| EP | 1024627 | 8/2000 |
| EP | 1119151 | 7/2001 |
| EP | 1484860 A1 | 12/2004 |
| JP | 2005-217757 | 8/2005 |
| WO | WO03090034 | 10/2003 |
| WO | WO2004010659 | 1/2004 |
| WO | WO2007136811 A3 | 11/2007 |

OTHER PUBLICATIONS

Bellovin, "Distributed Firewalls," www.securitytechnet.com/resoursue/security/firewall/distfw.pdf, 11 pages printed Apr. 21, 2006.

Wolthusen, "Layered Multipoint Network Defense and SEcurity Policy Enforcement," www.itoc.usma.edu/workshop/2001/authors/submitted_abstracts/paperT2B1(04).pdf, pp. 100-108, IEEE (2001).

Office Action from the State Intellectual Property Office of The People's Republic of China regarding Application No. 200780016108.8 dated Mar. 22, 2011.

International Preliminary Report on Patentability, Written Opinion, and Search Report regarding International Application No. PCT/US2007/0011053, Dated Oct. 14, 2008.

International Search Report regarding International Application No. PCT/US2007/011637 dated Dec. 28, 2007.

International Preliminary Report on Patentability, Written Opinion, and Search Report regarding International Application No. PCT/US2007/012024, Dated Jan. 22, 2008.

"Cisco Catalyst 6500 and Cisco 7600 Firewall Services Module", Cisco Systems, Inc., Oct. 2005, available at http://www.cisco.com/application/pdf/en/us/guest/products/ps4452/c1031/cdccont_0900aecd80356e40.pdf.

"German Information Security Agency (BSI) Firewall Study II", Ernst & Young and Sun Microsystems GmbH, May 2001, available at http://www.bsi.de/literat/studien/firewall/fw01eng/fwstude.pdf.

"Firewalking a Traceroute-Like Analysis of IP Packet Responses to Determine Gateway Access Control Lists, Cambridge Technology Partners," Oct. 1998, available at http://www.packetfactory.net/firewalk/firewalk-final.html.

European Search Report regarding European Application No. 04009309.8 dated May 5, 2005.

Strassner et al., Policy Framework Core Information Model, Internet Draft, May 17, 1999, XP002255652.

Vagish et al., NT5.1 IPSecurity Security Policy Database, Microsoft Corporation, Sep. 1999.

Markham et al., Security at the Network Edge: A Distributed Firewall Architecture, Jun. 12-14, 2001, DARPA Information Survivability Conference & Exposition II, 2001. Discex '01. Proceedings.

McDonald et al., A Socket-Based Key Management API (and Surrounding Infrastructure), retrieved from http://www.isoc.orglisoclwhatislconferenceslinetl96/proceedsingsld7/d7 2htm on May 21, 2005.

Bellovin, "Computer Security—An End State?", Communications of the ACM, vol. 44. No. 3, Mar. 2001.

"Distributed Firewalls.com", Network—1 Security Solutions, Inc., at http://207.254.108.217/firewall.html, visited May 31, 2001.

"Whister Server Authorization in IPSec", IPSec development Team, Microsoft, May 2000.

"NT 6.0 User Authentication", IPSec Development Team, Microsoft, May 2000.

"NT 6.0 IPSecWinsock Extensions", IPSec Development Team, Nov. 2000.

Adoba, "The Authentication and Authorization Problem in Roaming", Network Working Group, Mar. 1997.

Narayan, Diameter Strong Securitiy Extension Using Kerberos v5, Network Working Group, Feb. 2001.

Narayan, Radius Securitiy Extensions Using Kerberos v5, Network Working Group, Aug. 2000.

Jiang, "Secure Radius Server Operation Guidelines for Dial Roaming", Network Working Group, Oct. 1997.

Aboba, "Certificate-Based Roaming", Network Working Group, Feb. 1999.

"IP Security for Microsoft Windows 2000 Server White Paper", Microsoft Windows 2000 Server Operating System, Microsoft Corporation, 1999.

Leblanc, "Bind Basics", http://www.windowsitpro.comlWindowsSecurity/Article/ArticleID/9196/9196.html, Jun. 2000.

Harkins et al, RFC 2409, "The Internet Key Exchange (IKE)", Nov. 1998.

Rigney et al., Remote Authentication Dial in User Service (RADIUS), The Internet Society, Jun. 2000.

Rigney, "RADIUS Accounting", The Internet Society, Jun. 2000.

McDonald et al., "PF_KEY Key Management API, Version 2", The Internet Society, Jul. 1998.

Calhoun et al., "DIAMETER Base Protocol", The Internet Society, Apr. 2000.

Calhoun, "Comparison of DIAMETER Against AAA Network Access Requirements, The Internet Society, Apr. 2000.

Calhoun et al., "DIAMETER Framework Document", The Internet Society, Apr. 2000.

Calhoun et al., "DIAMETER Secure Proxying", The Internet Society, Oct. 1999.

Calhoun et al., "DIAMETER Strong Security Extension", The Internet Society, Apr. 2000.

"UDDI Technical White Paper", Universal Description, Discovery and Integration (uddi.org), Ariba, Inc. International Business Machines Corporation, Sep. 2000.

"Host-Resident Firewalls: Defending Windows NTI2000 Servers and Desktops from Network Attacks, A Security White Paper", Network—1 Security Solutions, Inc., 2000.

Li, "Distributed Firewall", Dec. 2000.

Ioannidis et al., Implementing a Distributed Firewall, DARPA, Nov. 2000.

Office Action from the Japanese Patent Office regarding Japanese Patent Application No. 2009-509784 dated Nov. 8, 2011.

Seiichi Sakaya, A dynamic policy control framework of IP network based on the session control information, The Institute of Electronics, Information and Communication Engineers Technical Report, vol. 104, No. 616, Japan, The Institute of Electronics, Information and Communication Engineers, Jan. 20, 2005, p. 1-4.

* cited by examiner

INTEGRATION OF SOCIAL NETWORK INFORMATION AND NETWORK FIREWALLS

BACKGROUND

Networked computers represent significant targets of opportunity for both recreational and malicious hackers, viruses, worms, scripted attacks, etc. Hacks and hackers are called different things and have different levels of sophistication, but in almost all cases successful hacks gain access to a computer through its network interface. This is particularly true when the network interface is coupled to the Internet. Computers supporting Internet Protocol (IP) and other IP network nodes, are identified by their IP address. Each network interface may support thousands of ports. To help manage security of the network interface, a firewall may be employed to process data arriving for individual ports. Some ports such as port 80, commonly used for HTTP protocol support, may be assigned or opened to allow traffic to pass through to a corresponding service, for example, running on a web server, that manages HTTP traffic. The firewall may close all other ports to restrict outside traffic from gaining access to connected devices on an internal network.

Internet protocol security (IPsec) allows the remote user or machine to be identified and is an additional mechanism for providing security to Internet traffic. A firewall may be programmed to require IPsec security on incoming connections. However, maintaining accurate connection information in a firewall can become tedious and prone to error. Detailed configuration knowledge may be required and the highest levels of protection may require frequent changes to the settings. For example, broad application level exceptions may be authorized because it is too difficult or time-consuming to program a narrower, more appropriate, exception. Furthermore, due to the difficulty of configuring such elaborate settings, firewall configuration is generally statically set, wherein exceptions are configured once and then left unaltered thereafter. This decreases the security of the machine by causing the firewall configuration to not accurately represent the precise security requirements of a machine at a given moment, but instead represent the least restrictive superset of the needed configuration at all times.

SUMMARY

Instead of manually entering an allowed IP address or list of remote users to allow for setting a firewall exception, an invitation mechanism may be programmed to extract data about a connection invitation sent to an outside party and to appropriately program the firewall exception. The exception may be specific to the particular connection invitation, and, optionally, for limited duration. The invitation mechanism may be associated with an application, for example, an instant messaging program, or a game. Alternatively, the invitation mechanism may be part of an operating system callable by an application or trapped by the OS itself. The firewall may receive an application handle and an identifier for the outside party, such as cryptographic material. The cryptographic material may be a public-key. The identifier for the outside party may be a handle, or pointer, to the public-key or an equivalent, such as a certificate. The exception may be timed corresponding to the type of application or invitation. For example, an exception for an e-mail-based invitation may be available for a period of hours, whereas an IP-based invitation for a game may be available for a minute or less. By making available the cryptographic material (e.g. public key) for an IPsec connection, the firewall can process the connection without interruption to the application, user, or OS.

DETAILED DESCRIPTION OF VARIOUS EMBODIMENTS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
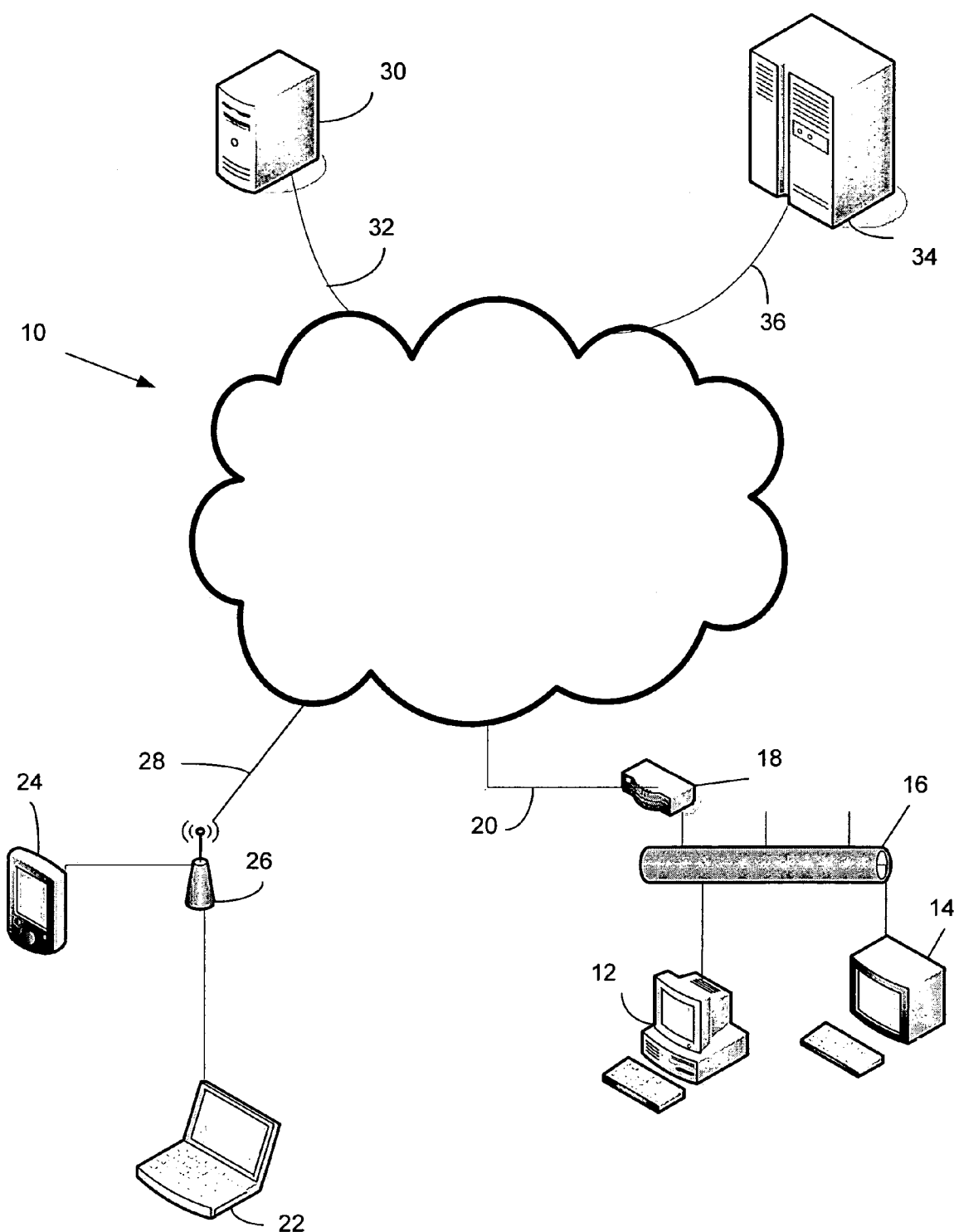
FIG. 1 is a simplified and representative block diagram of a computer network.

FIG. 1 illustrates a network 10 that may be used to implement a peer-to-peer network. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20 using a modem (not depicted). On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. Peer-to-peer network endpoints may be associated with each of the connected devices on the network 10.

Figure 2:
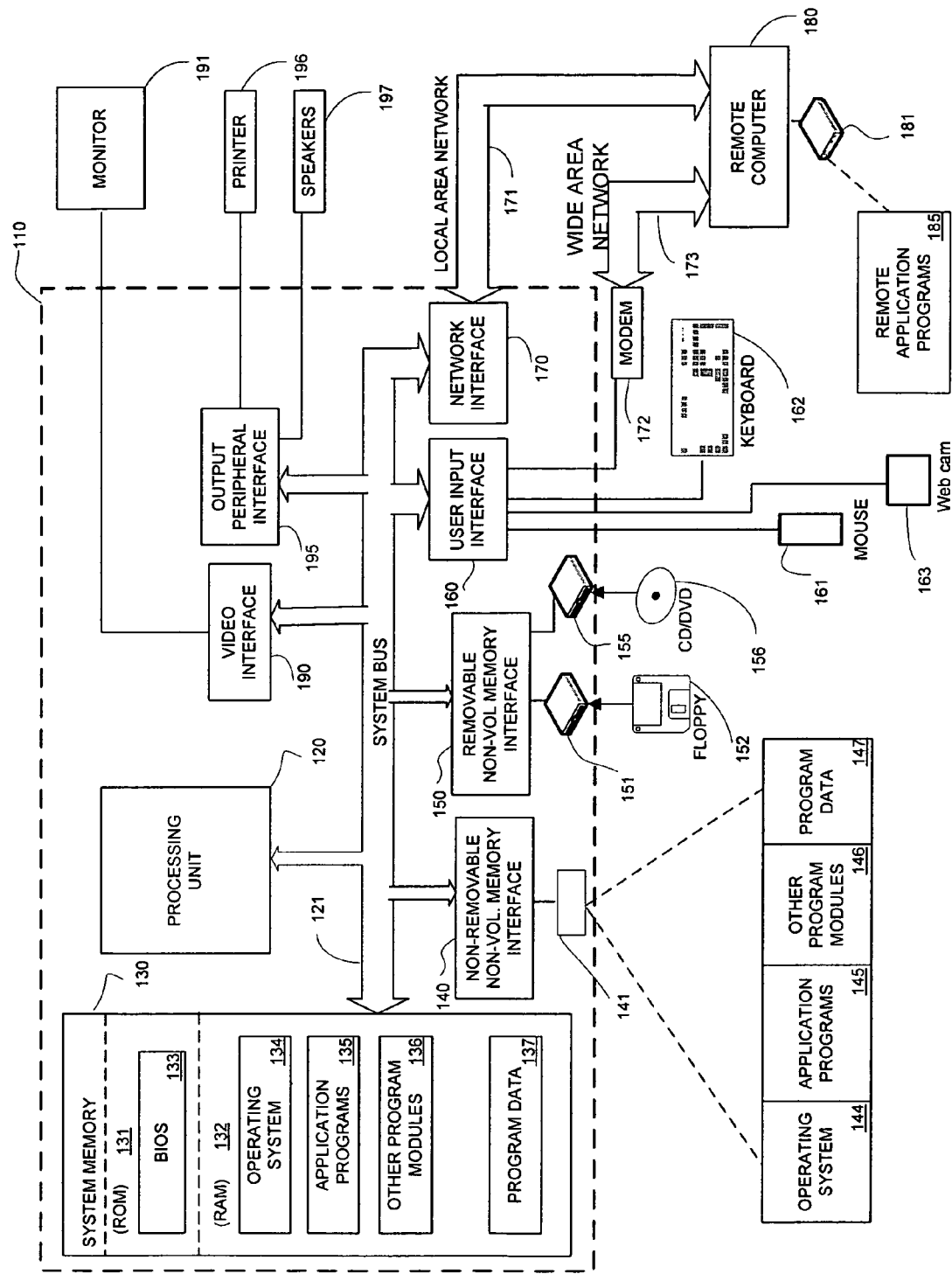
FIG. 2 is a block diagram of a computer that may be connected to the network of FIG. 1.

FIG. 2 illustrates a computing device in the form of a computer 110, representing any of the devices that may be connected to the network 10. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Another input device may be a camera for sending images over the Internet, known as a web cam 163. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
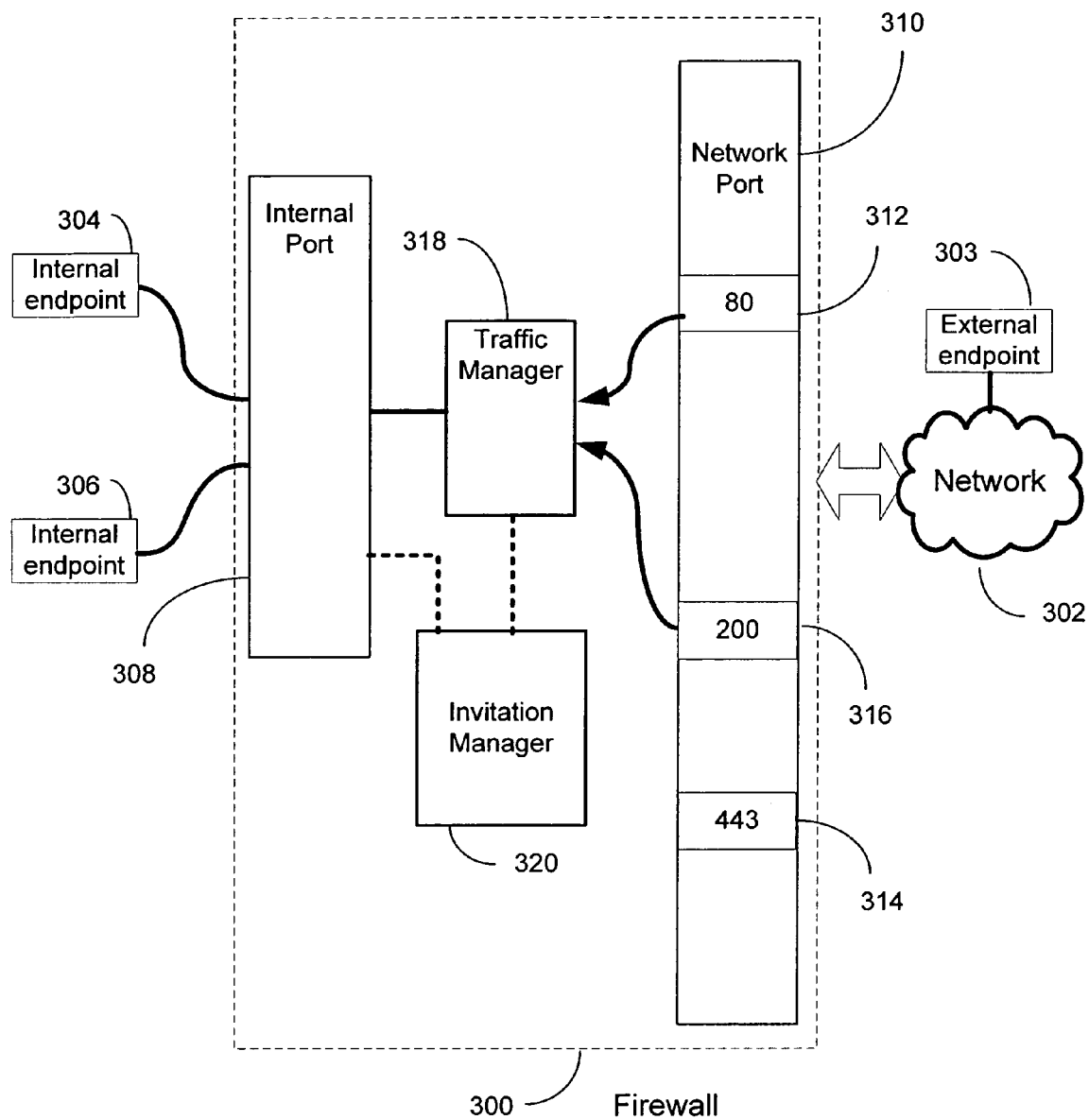
FIG. 3 is a simplified and representative block diagram of a firewall.
Figure 4:
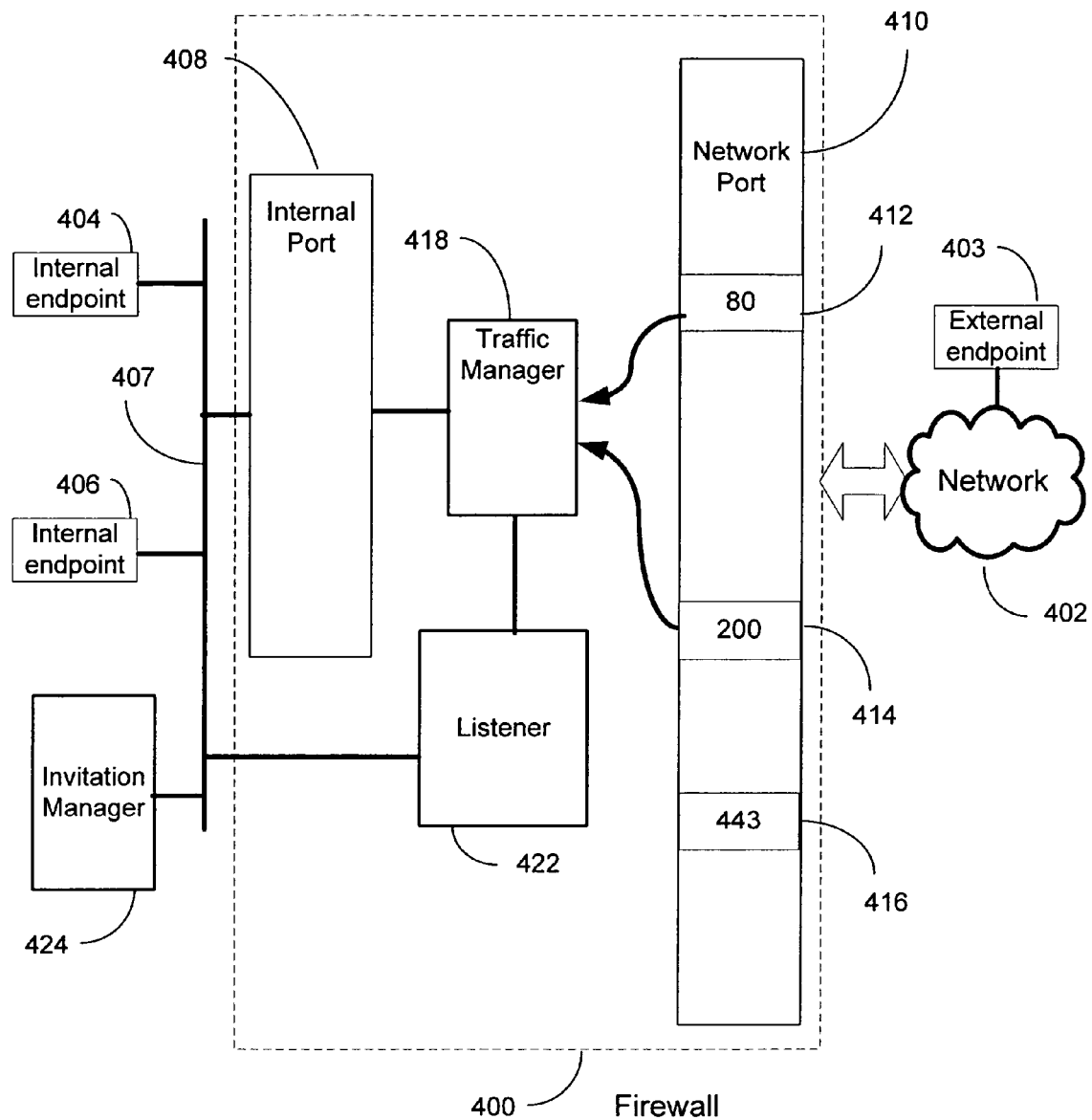
FIG. 4 is a simplified and representative block diagram of an alternative embodiment of the firewall of FIG. 3.

In FIG. 3, a simplified and representative block diagram of a firewall and connected systems is discussed and described. The firewall 300 may be coupled between a network 302 and one or more internal endpoints 304 306. The internal endpoints 304 306 may be computers or may be other addressable entities participating in a network, such as an application, e.g., a game. The firewall 300 may be coupled to the internal endpoints 304 306 either directly, as shown, or through a local area network (LAN) as shown in FIG. 4. The firewall 300 may support data traffic to the internal endpoints 304 306 using an internal port 308 that can pass data in both directions.

The firewall 300 may support bidirectional data traffic with an external endpoint 303 on the external network 302 via a network interface 310. The network interface 310 may support a series of logical ports known in the use of the standard Internet Protocol (IP). Some logical ports have standard uses assigned by IANA, for example, port 80 (312) is often used for hypertext transfer protocol (http) data, while port 443 (314) is commonly used for hypertext transfer protocol secured (https) data. Other logical ports may be used for unregistered protocols, such as instant messaging (IM) or for games. Logical port 200 (316) is an exemplary logical port.

A traffic manager 318 may couple the internal port 308 and the network interface 310. The traffic manager 318 may be primarily operable to manage traffic from the network 302 inbound to one or more of the internal endpoints 304 306. A goal of the traffic manager 318 and the traffic management process is to protect internal endpoints, such as internal endpoints 304 306 from malicious attacks or other detrimental access via the application of filtering rules. For example, the traffic manager may pass traffic on open logical ports, such as, logical port 80 (312) and may block traffic on closed logical ports, such as logical port 200 (316).

A port may be opened on an exception basis, for example, the traffic manager 318 may be instructed to pass data traffic directed to a particular endpoint, such as, endpoint 304 that may represent, in one embodiment, a game or IM client. The exception may be authorized for only that application, and for a length of time. Application exceptions may be manually programmed via a management interface to the firewall. However, such programming typically requires detailed knowledge of the firewall 300 and characteristics of the endpoint in question. After use, the exception may need to be manually removed at the end of the exception period as most current firewalls have no intrinsic support for temporary exceptions. The end result may be that exceptions that would be beneficial to a user may not be programmed due to lack of knowledge or time. Alternatively, but perhaps more dangerous, exceptions may be opened for more logical ports than are necessary, those ports may be opened to more remote endpoints than needed, or the exceptions may be applied for an indefinite period of time, creating a hazard from malicious traffic.

Many peer-to-peer network applications are capable of sending invitations to outside entities, for example, another game player. The invitation may carry specific information about the endpoint extending the invitation and will also have certain information about the outside entity. Such information may include an endpoint address, port information and, in some cases, public key information that may have been received out-of-band, for example, via an email or IM or from a central trusted server. In some embodiments, a handle, or pointer, to the public key infrastructure data may be passed, instead of the actual key or certificate. Furthermore, such a handle may be indirect, such as the case where a handle to an contact information datastructure is passed, while that structure in turn holds a handle to the actual cryptographic data. Whether direct or indirect, authenticable identifier of the endpoint may be required for establishing an authenticated and secure connection. The authenticable identifier may be a peer name registered in the group, a verifiable pathname, an endpoint authenticated by a trusted third party, such as a server or server process, or another entity for which trust has been established, such as by exchanging data out-of-band.

An invitation manager 320 may reside inside the firewall 300. In other embodiments, described below, the invitation manager function may be separate from the firewall 300. The invitation manager 320 may support forming, sending, and tracking invitations to peer-to-peer network participants. The invitation manager may serve as a subsystem and present an application program interface (API) allowing internal endpoints, such as internal endpoints 304 and 306 to pass data about an external peer-to-peer network participant and the type of connection desired. The invitation manager 320 may then formulate the request and forward the necessary invitation. For example, when an IPsec connection is required by the internal endpoint, a public key or a nonce may be forwarded to the external peer-to-peer network participant for use in connecting back to the firewall. When no IPsec connection is required, such extra data may not be sent. The invitation manager may also gather information from the invitation and modify the settings in the traffic manager 318 corresponding to the invitation details. This information could be gathered from both the contents of the invitation, as well as from information about the invitation's intended destination, such as the public key data for the destination.

Data in an invitation to an external endpoint, such as external endpoint 303 offered by an internal endpoint, for example, internal endpoint 304, may be extracted, evaluated, and used to signal the traffic manager 318 to open an exception corresponding to the invitation. For example, an exception on a specific port can be opened for a two minute window for incoming traffic from the specified external endpoint 303 destined for the internal endpoint 304. In addition, when the invitation has the required cryptographic material, such as a public key or a handle pointing to a public key infrastructure (PKI) certificate containing the public key, the exception can be further limited to require an IPsec connection from the specific remote entity before allowing traffic on the designated logical port.

FIG. 4 depicts an embodiment of a firewall 400 similar to the firewall 300 of FIG. 3. The firewall 400 couples a network 402, for example, the Internet, to one or more internal endpoints 404 406 via a local area network 407. An internal port 408 couples the internal endpoints 404 406 to the firewall 400 on the 'protected' side of the firewall 400. A network port 410 couples the firewall 400 to a representative external endpoint 403 via the network 402. Other external endpoints (not depicted) are assumed to exist on the network 402. As above, a number of logical ports 412 414 416 may support individual connections to the network 402. In a different embodiment, the firewall may exist in software on a client machine, logically operating similarly to the remote firewall explained above. In such an embodiment, the firewall software intercepts all traffic from the physical network interface on all ports, inspects the traffic and applies filtering rules, and then, subject to those rules, forwards the traffic to applications on the system that are logically bound to the network on a given port. In the outbound traffic case, data flows from these applications through the firewall and its filtering rules and out through the network interface. In either embodiment, a traffic manager 418 may enforce both default and programmed rules for allowing and blocking data traffic through the firewall 400. In the embodiment of FIG. 3, an invitation manager 320 offers services to participants for extending invitations to external parties on the network 302. In the embodiment of FIG. 4, a listener 422 monitors data from an invitation manager 424 to extract data related to programming exceptions for the firewall 400. The invitation manager 424 may be a utility associated with an operating system 144 or may be an element of an individual application program 145. The listener 422 may monitor all outputs from the invitation manager 424 and extract necessary data for programming the firewall. Alternatively, the listener 422 may have an API that receives data from the invitation manager 424 explicitly directed to programming the firewall 400. The listener 422, after extracting the necessary data from an invitation may determine the appropriate configuration for the firewall and manage the configuration of the traffic manager to accomplish the specific requirements associated with the invitation.

The PeerCollabInviteEndpoint function, shown below, shows an exemplary invitation to join a peer-to-peer group. Invitations may be represented as Unicode strings. Additional information and details about peer-to-peer network group formation and management are freely available on the Internet and are well known to those practicing in the art.

The PeerCollabInviteEndpoint function sends an invitation to a specified peer enpoint to join the sender's Peer Collaboration activity. This call is synchronous and, if successful, obtains a response from the peer endpoint.

```
HRESULT WINAPI PeerCollabInviteEndpoint(
    const PPEER_ENDPOINT pcEndpoint,
    const PCPEER_INVITATION_REQUEST pcInvitationRequest,
    PPEER_INVITATION_RESPONSE* ppResponse
);
```

Parameters
pcEndpoint
  [in] Pointer to a PEER_ENDPOINT structure (see definition below) that contains information about the invited peer. This peer is sent an invitation when this API is called.
  This parameter must not be set to NULL.
pcInvitationRequest
  [in] Pointer to a PEER_INVITATION_REQUEST structure (see definition below) that contains the invitation request to send to the endpoint specified in pcEndpoint.
  This parameter must not be set to NULL.
ppResponse
  [out] Pointer to a PEER_INVITATION_RESPONSE structure (see definition below) that receives an invited peer endpoint's responses to the invitation request.

The PEER_ENDPOINT structure contains the address and friendly name of a peer endpoint.

```
typedef struct {
    PEER_ADDRESS address;
    PWSTR pwzEndpointName;
} PEER_ENDPOINT,
  *PPEER_ENDPOINT;
typedef const PEER_ENDPOINT *PCPEER_ENDPOINT;
```

Members:
address: PEER ADDRESS structure that contains the IPv6 network address of the endpoint
pwzEndpointName: Zero-terminated Unicode string that contains the specific displayable name of the endpoint.
Remarks
A peer "endpoint" describes a contact's presence location—the unique network address configuration that describes the currently available instance of the contact within the peer collaboration network. A single contact can be available at multiple endpoints within the peer collaboration network.
A peer watching a contact can query any of the endpoints associated with that contact for specific peer presence, application, or object updates.

The PEER_INVITATION_REQUEST structure contains a request to initiate or join a peer collaboration activity.

```
typedef struct {
    GUID applicationId;
    PEER_DATA applicationData;
    PWSTR pwzMessage;
} PEER_INVITATION_REQUEST,
  *PPEER_INVITATION_REQUEST;
typedef const PEER_INVITATION_REQUEST
  *PCPEER_INVITATION_REQUEST;
```

Members
applicationId
  GUID value that uniquely identifies the registered software or software component for the peer collaboration activity.
applicationData
  PEER DATA structure that contains opaque data describing possible additional application-specific settings (for example, an address and port on which the activity will occur, or perhaps a specific video codec to use).
pwzMessage
  Zero-terminated Unicode string that contains a specific request message to the invitation recipient.
Remarks
An invitiation request is typically sent by a peer after a contact appears online within the peer collaboration network and a call to PeerCollabEnumApplications returns a common software application (represented as a application GUID) available on the contact's endpoint.

The PEER_INVITATION_RESPONSE structure contains a response to an invitation to join a peer collaboration activity.

```
typedef struct {
    PEER_INVITATION_RESPONSE_TYPE action;
    PWSTR pwzMessage;
    HRESULT hrExtendedInfo;
} PEER_INVITATION_RESPONSE,
```

-continued

```
*PPEER_INVITATION_RESPONSE;
typedef const PEER_INVITATION_RESPONSE
*PCPEER_INVITATION_RESPONSE;
```

Members
action: PEER_INVITATION_RESPONSE_TYPE enumeration value that specifies the action the peer takes in response to the invitation.
pwzMessage: Set to NULL. This member is written exclusively by the Peer Collaboration Infrastructure.
hrExtendedInfo: Reserved.

Figure 5:
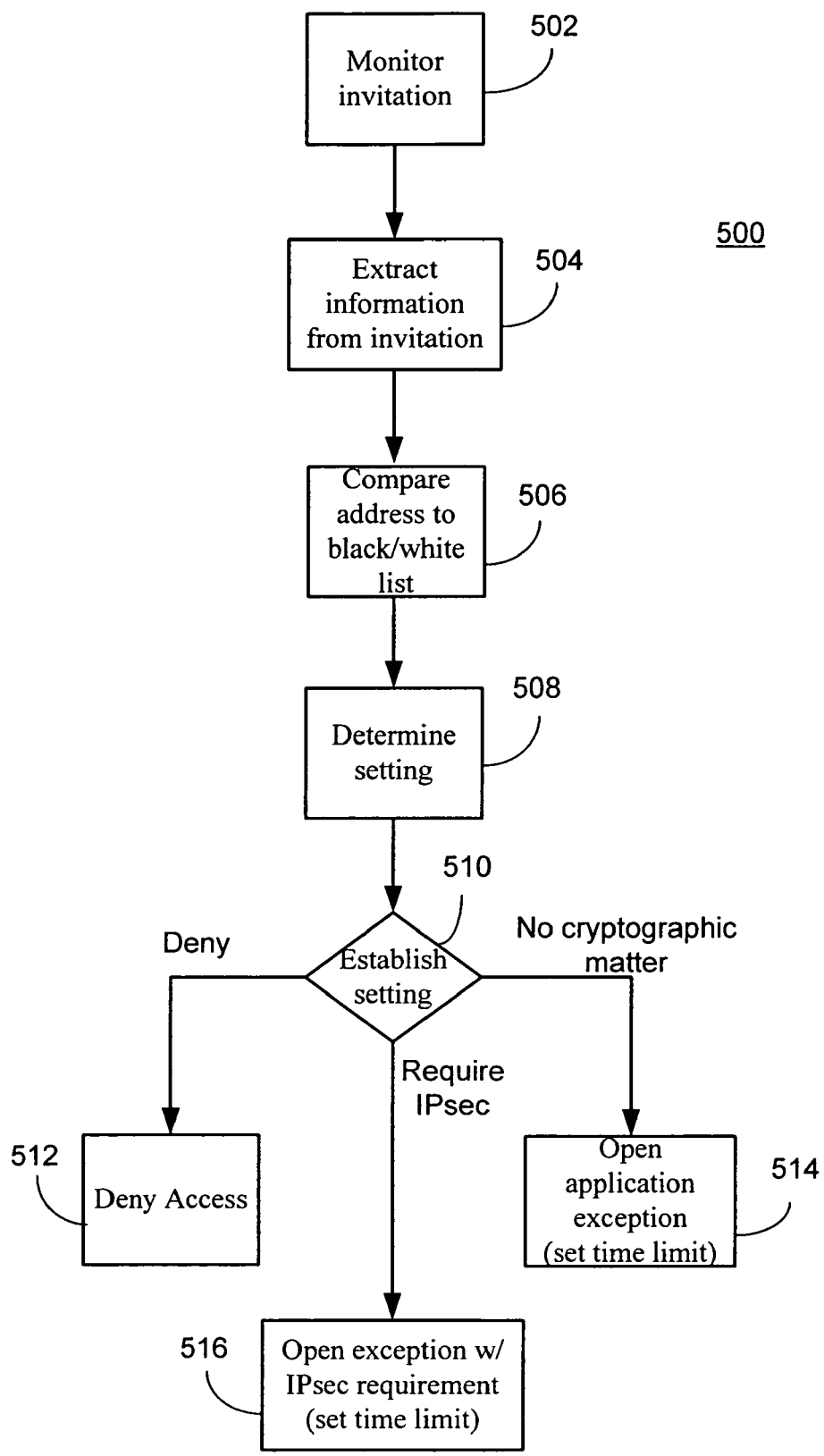
FIG. 5 is a flow chart of a method of using information from a peer-to-peer network invitation to dynamically program a firewall.

FIG. 5 depicts a method 500 of using information from a peer-to-peer network invitation to dynamically program a firewall, such as firewall 300 of FIG. 3 or firewall 400 of FIG. 4. An invitation to an external peer may be monitored at block 502 and, at block 504, information from the invitation may be extracted. As discussed above, the information may include the identity of an application issuing the invitation, destination (peer) information, and cryptographic information necessary to establish an IPsec connection, when required or requested.

In one embodiment, at block 506, information extracted from the invitation may be compared to a list of known endpoint machines, users, groups of users or applications, henceforth referred to as entities or network endpoints. The list may be an allow list, that is, a list of entities that are to be allowed for connection. Other criteria may also apply, such as, a limited duration exception windows or it is mandatory that the remote entity be authenticated or that the connections be encrypted. In another exemplary embodiment, the list may be a disallow list, signifying entities for which connections are never allowed. In some cases, both lists may exist and be checked before determining the setting for the firewall 300, but in such cases the disallow list would likely take precedent, and the allow list may include special conditions for allowing connections to those designated network endpoints. The lists may be maintained at the invitation manager 320 or 424, but may also be maintained in the listener 422 or even in the traffic manager 318 418. The lists may be maintained by a network administrator, or in some less formal cases, a parent wishing to exercise control over instant messaging or gaming activities of their child. In most cases, the allow and disallow lists are restricted to be modifiable only by the administrator of the system, be that the network administrator or the parent.

When the information has been extracted from the invitation, and any comparisons to allow or disallow list made, a setting for the firewall may be determined at block 508. To establish the setting, a determination at block 510 may be made based on the information generated at block 508. When the determination is to deny access, the 'deny' branch from block 510 may be followed to block 512, where a setting is made with the traffic manager 318 418 to deny access from the identified external endpoint, by identifying an IP address, a peer name, or cryptographic credentials. When the determination is made to allow access without requiring an authenticated and secure connection, the 'no cryptographic matter' branch from block 510 may be followed to block 514 and the traffic manager 318 418 may be set to open a general application exception for allowing traffic from external endpoints.

An example of an authenticated and secure connection is the IP secure or IPsec connection. Authentication may include the process of establishing the identity of the other party, often through use of public key infrastructure credentials. Securing the connection may include development of session keys for use by both parties to encrypt traffic helping to ensure that messages are passed untampered and are not readable by external parties monitoring message traffic.

Additionally, based on the application itself, a valid period of time may be set for the external endpoint to attempt to connect. As mentioned above, a game or IM application connection invitation may be valid for a fairly short, for example one minute. An e-mail based invitation may be valid for a longer period, such as several hours.

When it is determined that enough information is present to support an IPsec connection, or if a general setting or an allow list entry requires an IPsec connection, the 'Require IPsec' branch from block 510 may be followed to block 516. At block 516, and exception may be programmed for a specific external endpoint and the required cryptographic matter to support establishment of the IPsec connection, for example, a public key or handle, may be forwarded to the traffic manager 318 418.

As peer-to-peer networking becomes more pervasive the need to control such connections will become more critical for both successful peer-to-peer connections and the security of endpoints participating on those connections. As such, the ability to monitor and appropriately react to invitations sent to external endpoints will have a significant and positive impact on the spread of peer-to-peer networking from a novelty for file sharing to a tool supporting all aspects of personal, enterprise, and academic computing.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:
1. A method of operating a firewall embodied as a standalone hardware device, the method comprising:
providing the firewall operatively coupled to one or more internal endpoints and configured to provide firewall services to the one or more internal endpoints for traffic arriving through a network connection from one or more external endpoints;
monitoring, at the firewall, an invitation to join in peer-to-peer activity sent from a first internal endpoint to a first external endpoint, wherein the first internal endpoint, the first external endpoint, and the firewall are separate devices;
extracting, at the firewall, information from the invitation in transit between the first internal endpoint and the first external endpoint;
comparing, at the firewall, the information extracted from the invitation to a list of entities for which the first internal endpoint requires an authenticated connection;
determining, at the firewall, that the first internal endpoint requires an authenticated connection with the first external endpoint;

determining, at the firewall, whether the information extracted from the invitation includes cryptographic matter to support establishment of the authenticated connection with the first external endpoint;

storing, at the firewall, a firewall setting specific to the first external endpoint that blocks incoming traffic from the first external endpoint destined for the first internal endpoint;

dynamically programming, at the firewall, a firewall exception for the firewall setting specific to the first external endpoint when the information extracted from the invitation includes the cryptographic matter, wherein the firewall exception sets a limited duration period for the first external endpoint to attempt to establish the authenticated connection with the first internal endpoint over the network connection; and configuring, at the firewall, the network connection for receiving incoming traffic from the first external endpoint destined for the first internal endpoint in accordance with the firewall setting specific to the first external endpoint.

2. The method of claim 1, wherein the information extracted from the invitation comprises a network address of the first external endpoint.

3. The method of claim 1, further comprising:
comparing the network address of the first external endpoint with a list of approved addresses; and
storing, at the firewall, a firewall setting specific to the first external endpoint that blocks incoming traffic from the first external endpoint destined for the first internal endpoint when the network address of the first external endpoint does not match an entry from the list of approved addresses.

4. The method of claim 1, wherein the information extracted from the invitation comprises an authenticable identifier of the first external endpoint that includes one or more of a registered peer name, a verifiable pathname, and an identifier of an endpoint authenticated by a trusted third party.

5. The method of claim 2, further comprising:
comparing the network address of the first external endpoint with a list of non-approved addresses; and
storing, at the firewall, a firewall setting specific to the first external endpoint that blocks incoming traffic from the first external endpoint destined for the first internal endpoint when the network address of the first external endpoint matches an entry from the list of non-approved addresses.

6. The method of claim 1, wherein the invitation is sent by a peer-to-peer network application of the first internal endpoint.

7. The method of claim 1, further comprising:
extracting information from a second invitation to join in peer-to-peer activity sent from the first internal endpoint to a second external endpoint;
comparing the information extracted from the second invitation to the list of entities for which the first internal endpoint requires an authenticated connection, wherein the information extracted from the second invitation identifies an application associated with the second invitation;
determining, at the firewall, that the first internal endpoint does not require an authenticated connection with a second external endpoint;
storing, at the firewall, a firewall setting specific to the second external endpoint that blocks incoming traffic from the second external endpoint destined for the first internal endpoint;

dynamically programming, at the firewall, an application-level firewall exception for the firewall setting specific to the second external endpoint; and
configuring, at the firewall, the network connection for receiving incoming traffic from the second external endpoint destined for the first internal endpoint in accordance with the firewall setting specific to the second external endpoint.

8. The method of claim 7, wherein the application-level firewall exception sets a limited duration for the second external endpoint to attempt to connect to the first internal endpoint via the application over the network connection.

9. The method of claim 1, wherein:
the information extracted from the invitation identifies an application associated with the invitation, and
the limited duration period of the firewall exception is based on the application.

10. A computing device comprising:
a processor for executing computer-executable instructions; and
memory storing computer-executable instructions for providing firewall services to one or more internal endpoints for traffic arriving through a network connection from one or more external endpoints, the computer-executable instructions comprising instructions for:
monitoring an invitation to join in peer-to-peer activity sent from a first internal endpoint to a first external endpoint, wherein the first internal endpoint, the first external endpoint, and the firewall are separate devices;
extracting information from the invitation in transit between the first internal endpoint and the first external endpoint;
comparing the information extracted from the invitation to a list of entities for which the first internal endpoint requires an authenticated connection;
determining that the first internal endpoint requires an authenticated connection with the first external endpoint;
determining whether the information extracted from the invitation includes cryptographic matter to support establishment of the authenticated connection with the first external endpoint;
storing a firewall setting specific to the first external endpoint that blocks incoming traffic from the first external endpoint destined for the first internal endpoint;
dynamically programming a firewall exception for the firewall setting specific to the first external endpoint when the information extracted from the invitation includes the cryptographic matter, wherein the firewall exception sets a limited duration period for the first external endpoint to attempt to establish the authenticated connection with the first internal endpoint over the network connection; and
configuring the network connection for receiving incoming traffic from the first external endpoint destined for the first internal endpoint in accordance with the firewall setting specific to the first external endpoint.

11. The computing device of claim 10, wherein the information extracted from the invitation comprises a network address of the first external endpoint.

12. The computing device of claim 10, wherein the computer-executable instructions further comprise instructions for:

comparing the network address of the first external endpoint with a list of approved addresses; and storing a firewall setting specific to the first external endpoint that blocks incoming traffic from the first external endpoint destined for the first internal endpoint when the network address of the first external endpoint does not match an entry from the list of approved addresses.

13. The computing device of claim 10, wherein the information extracted from the invitation comprises an authenticable identifier including one or more of a registered peer name, a verifiable pathname, and an identifier of an endpoint authenticated by a trusted third party.

14. The computing device of claim 13, wherein the computer-executable instructions further comprise instructions for:

comparing the network address of the first external endpoint with a list of non-approved addresses; and storing, at the firewall, a firewall setting specific to the first external endpoint that blocks incoming traffic from the first external endpoint destined for the first internal endpoint when the network address of the first external endpoint matches an entry from the list of non-approved addresses.

15. The method of claim 10, wherein the invitation is sent by a peer-to-peer network application of the first internal endpoint.

16. The computing device of claim 10, wherein the computer-executable instructions further comprise instructions for:

extracting information from a second invitation to join in peer-to-peer activity sent from the first internal endpoint to a second external endpoint;

comparing the information extracted from the second invitation to the list of entities for which the first internal endpoint requires an authenticated connection, wherein the information extracted from the second invitation identifies an application associated with the second invitation;

determining, at the firewall, that the first internal endpoint does not require an authenticated connection with a second external endpoint;

storing, at the firewall, a firewall setting specific to the second external endpoint that blocks incoming traffic from the second external endpoint destined for the first internal endpoint;

dynamically programming, at the firewall, an application-level firewall exception for the firewall setting specific to the second external endpoint; and configuring, at the firewall, the network connection for receiving incoming traffic from the second external endpoint destined for the first internal endpoint in accordance with the firewall setting specific to the second external endpoint.

17. The computing device of claim 16, wherein the application-level firewall exception sets a limited duration for the second external endpoint to attempt to connect to the first internal endpoint via the application over the network connection.

18. The computing device of claim 10, wherein:

the information extracted from the invitation identifies an application associated with the invitation, and the limited duration period of the firewall exception is based on the application.

19. A computer storage medium that does not consist of a signal, the computer storage medium storing computer-executable instructions that, when executed, cause a computing device to perform steps for providing firewall services to one or more internal endpoints for traffic arriving through a network connection from one or more external endpoints, the computer-executable instructions comprising instructions for:

monitoring an invitation to join in peer-to-peer activity sent from a first internal endpoint to a first external endpoint, wherein the first internal endpoint, the first external endpoint, and the firewall are separate devices;

extracting information from the invitation in transit between the first internal endpoint and the first external endpoint;

comparing the information extracted from the invitation to a list of entities for which the first internal endpoint requires an authenticated connection;

determining that the first internal endpoint requires an authenticated connection with the first external endpoint;

determining whether the information extracted from the invitation includes cryptographic matter to support establishment of the authenticated connection with the first external endpoint;

storing a firewall setting specific to the first external endpoint that blocks incoming traffic from the first external endpoint destined for the first internal endpoint;

dynamically programming a firewall exception for the firewall setting specific to the first external endpoint when the information extracted from the invitation includes the cryptographic matter, wherein the firewall exception sets a limited duration period for the first external endpoint to attempt to establish the authenticated connection with the first internal endpoint over the network connection; and configuring the network connection for receiving incoming traffic from the first external endpoint destined for the first internal endpoint in accordance with the firewall setting specific to the first external endpoint.

20. The computer storage medium of claim 19, wherein the computer-executable instructions further comprise instructions for:

extracting information from a second invitation to join in peer-to-peer activity sent from the first internal endpoint to a second external endpoint;

comparing the information extracted from the second invitation to the list of entities for which the first internal endpoint requires an authenticated connection, wherein the information extracted from the second invitation identifies an application associated with the second invitation;

determining, at the firewall, that the first internal endpoint does not require an authenticated connection with a second external endpoint;

storing, at the firewall, a firewall setting specific to the second external endpoint that blocks incoming traffic from the second external endpoint destined for the first internal endpoint;

dynamically programming, at the firewall, an application-level firewall exception for the firewall setting specific to the second external endpoint; and configuring, at the firewall, the network connection for receiving incoming traffic from the second external endpoint destined for the first internal endpoint in accordance with the firewall setting specific to the second external endpoint.

* * * * *